May 2, 1967 J. A. OGLE, JR., ET AL 3,316,832
SELF-HEATED BIMETAL TIMER
Filed May 4, 1965 2 Sheets-Sheet 1
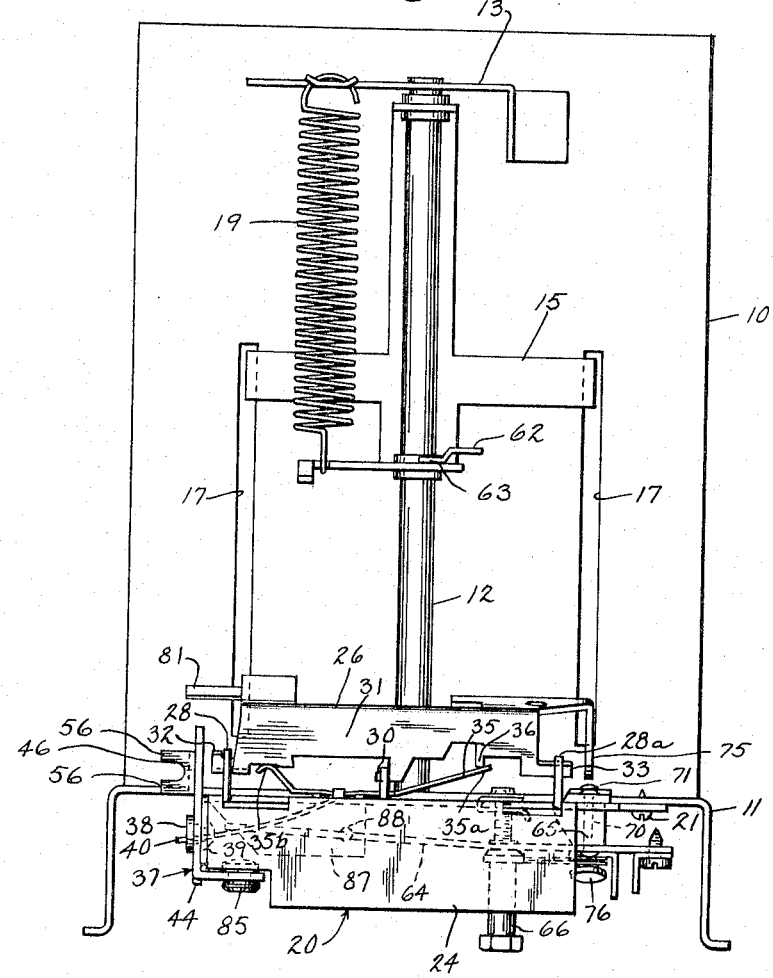
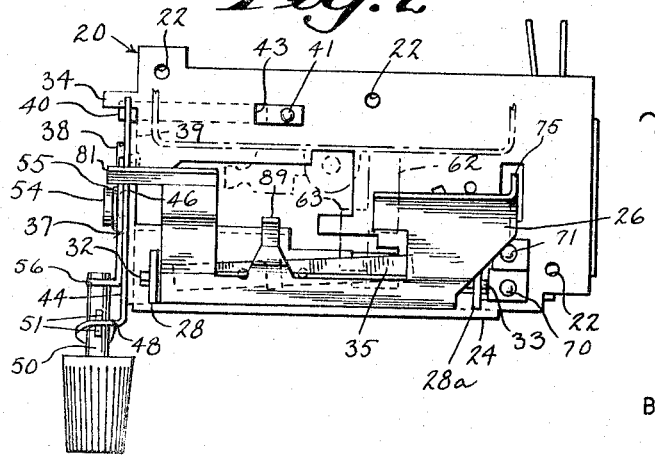
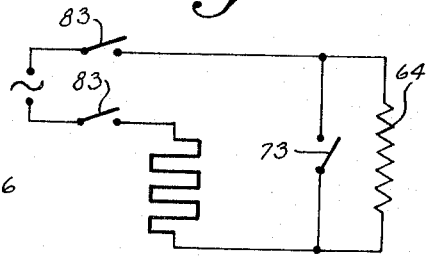
INVENTORS
JAMES A. OGLE, JR.
FRANKLIN C. HITZEROTH
RAYMOND A. ILLA
BY
*Robert W. Lahtinen*
ATTORNEY

INVENTORS
JAMES A. OGLE, JR.
FRANKLIN C. HITZEROTH
RAYMOND A. ILLA

BY *Robert W. Lahtinen*

ATTORNEY

United States Patent Office 3,316,832
Patented May 2, 1967

3,316,832
SELF-HEATED BIMETAL TIMER
James A. Ogle, Jr., Woodstock, and Franklin C. Hitzeroth and Raymond A. Illa, Elgin, Ill., assignors to McGraw-Edison Company, Milwaukee, Wis., a corporation of Delaware
Filed May 4, 1965, Ser. No. 453,057
10 Claims. (Cl. 99—329)

This invention relates to a toaster timer and more particularly to an improved timer of the type using a bimetal element with a heating period and a cooling period.

The applicants have not only provided a timing device, but also one which affords uniform cooking action irrespective of residual heat retained by the apparatus during successive cooking cycles and has done so with a simplified apparatus. The toaster of the present invention includes a timer having a manual control formed as a part of a single integral escapement lever assembly which carries the operating escapement mechanism and further both effect color or cycle control and provide the manual release mechanism. The escapement lever can further be mounted at a plurality of locations so that the manual control can be positioned at preselected positions at right angles to one another while utilizing the same parts to thereby enhance the utility of the timer for various applications.

It is an object of this invention to provide an improved bimetal timer using a minimum number of economically fabricated parts.

It is a further object of this invention to provide a bimetal timing mechanism having a single escapement lever with a plurality of latching portions.

It is a further object of this invention to provide a timer mechanism controllable from the end or side of the toasting unit that utilizes the same parts.

It is also an object of this invention to provide a timer including an escapement lever directly actuated by the bimetal element.

These and other objects and advantages of this invention will become apparent from the following description when taken in connection with the accompanying drawings wherein:

FIGURE 1 is an end elevation of a toaster with the housing removed and various parts broken away showing the oven bread slice carrier and the timer of this invention;

FIGURE 2 is a plan view of the timer shown in FIGURE 1;

FIGURE 8 is a schematic wiring diagram of the toaster of FIGURE 1.

Figure 3:
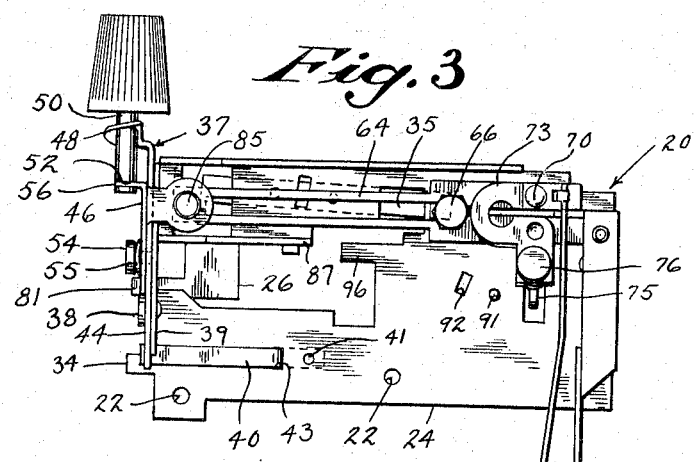
FIGURE 3 is a bottom view of the timer of FIGURE 2.

Referring to FIGURE 1, a toaster oven 10 is mounted on a main frame 11 with a rod 12 fixed at its upper end to a bracket 13 secured to the oven 10 and fixed at the lower end to the main frame. A bread slice carriage 15 is journaled about the rod 12 for vertical movement and has a pair of bread slice supports which project through a pair of slotted apertures 17 into the toasting chambers within the oven 10. A tension spring 19 interconnected between the carriage member 15 and the bracket 13 urges the carriage toward its position of uppermost travel.

Figure 4:
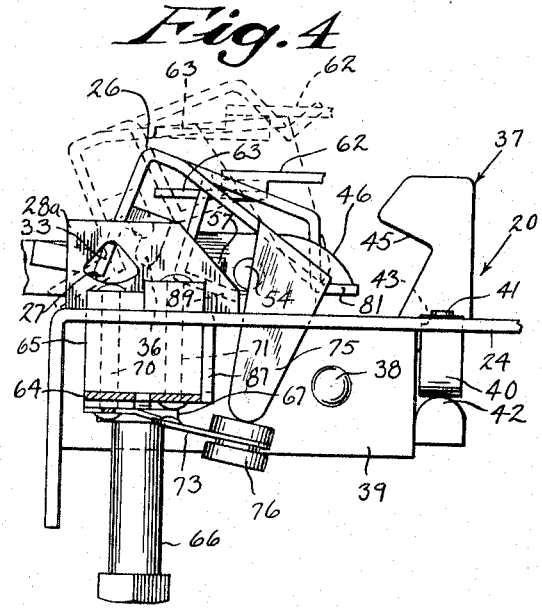
FIGURE 4 is a rear elevation view of the timer of FIGURE 2.

The timer 20 is secured to main frame 11 by a series of screws 21 which project through apertures 22 (FIGURE 2) to securely hold and positively position the timer base 24 with respect to the main frame of the toasting unit. A control lever 26 is pivotally mounted on the timer base through a pair of apertures 27 (FIGURE 5) which are in the form of generally circular segments in the vertically turned tabs 28 and 28a formed of the material of the timer support frame 24. Prior to assembly, the projection 30 of the control lever lies in the plane of the control lever portion 31 enabling the control lever to be positioned with the trunnions 32 and 33 lying parallel to the chord of the segment of aperture 27. The trunnion 33 is first inserted into the aperture 27 of tab 28a from left to right as seen in FIGURE 1 beyond it normal position which allows the trunnion 32 to enter the aperture 27 from the right side of the tab 28, as seen in FIGURE 1. Control lever 26 is then pivoted beyond the dotted line position as shown in FIGURE 4 enabling the projection 30 to be bent at right angles to the control lever portion 31. Thereafter the control lever can no longer be pivoted counterclockwise beyond the dotted line position of FIGURE 4 to again attain a position where the trunnions 32 and 33 lie across the respective chords of the apertures 27 causing the control lever to be retained captive with respect to the timer base 24. The control lever 26 is normally pivoted by a bias spring 35 in a counterclockwise direction toward the dotted position as seen in FIGURE 4 wherein the projection 30 of the control lever engages the timer frame 24. The bias spring 35 has one end 35a which engages the control lever projection 36 to bias the lever 26 in one direction and an opposite end 35b which engages the lever 26 adjacent the trunnion 32 to retain the trunnion 32 in contact with the apex of the segmental aperture 27.

Figure 5:
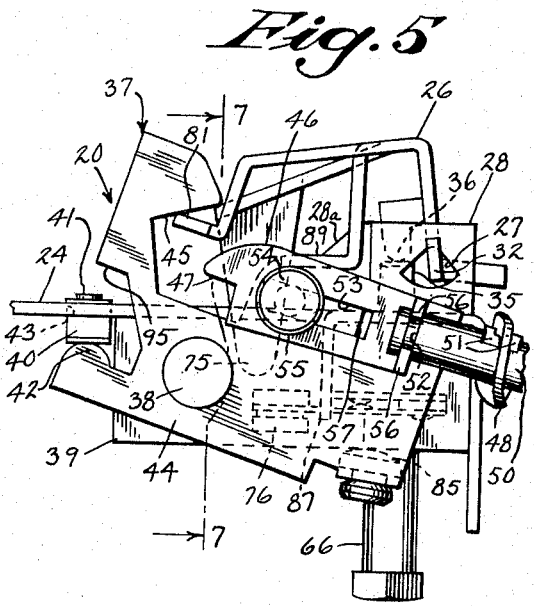
FIGURE 5 is a front elevation view of the timer of FIGURE 2.
Figure 6:
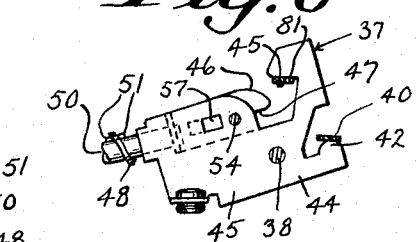
FIGURE 6 is a partial elevation view of the escapement lever.

As seen in FIGURES 2, 5, and 6 an escapement lever assembly 37 is pivotally mounted on the timer base by pin 38 which projects through apertures in the escapement lever assembly and the downwardly turned projection 39 of timer base 24. A leaf spring 40 which is positioned about an upwardly extending pin 41 carried by timer base 24 and passes downwardly beneath the frame through an aperture 43 to engage the projection 42 of the escapement lever assembly and normally pivot the escapement lever assembly in a counterclockwise direction as viewed in FIGURE 5 toward a position of engagement between the escapement lever assembly and timer base projection.

The escapement lever assembly includes a cool off latch 44 having a latching surface 45 and a cooperating heat up latch 46 with a confronting latch surface 47 disposed below the latching surface 45 when the escapement lever assembly is in a generally horizontal position, with the latching surfaces 45 and 47 cooperating to form an escapement that functions when the escapement lever assembly is pivoted about the axis of pin 38. Cool off latch 44 has a projection 48 which is formed as a circular ring and thereafter turned to approximately a right angle position with respect to the adjoining position of latch 44 and finally distorted to form a portion thereof into a partial helical convolution. A timing shaft 50 projects through the aperture of the projection 48. The shaft is swaged to form two projections 51 that are disposed at either axial side of the helical portion of the cool off latch projection 48. Accordingly, as timing shaft 50 is rotated about its axis it will progress in an axial direction as projections 51 engage the helical portion of projection 48. Timing shaft 50 also has an annular recess 52 formed therein. Heat up latch 46 has an elongated aperture 53 extending parallel to the axis timing shaft 50 through which projects a pin 54 carried by cool off latch 44. A spring washer 55 retains the heat up latch 46 in sliding contact with cool off latch 44. The end portion of heat up latch 46 adjoining timing shaft 50 is bifurcated and turned at right angles to the balance of the latch to form projections 56 disposed in the annular recess 52. Latch 46 will as a result progress in the direction of the axis of timing shaft 50 in unison with timing shaft 50. The shaft 50 and latch 46 are retained in correct alignment by a rectangular tab 57 which is pierce extruded from cool off lever 44, projects into aperture 53 and is engageable with the parallel side walls of the aperture.

Figure 7:
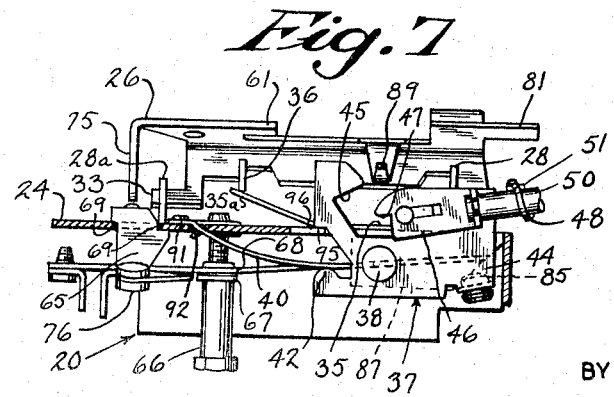
FIGURE 7 is a section view along line 7—7 of FIGURE 5 with the escapement lever mounted in the alternate position.

As seen in FIGURES 1, 3 and 4 a self-heating bimetal element 64 is supported on an insulating block 65 by a pair of rivets 70, 71. Bimetal 64 is of the self-heated type and has a generally U-shaped configuration. Insulating block 65 extends through an aperture in timer base 24 and is retained in position by biasing the shoulders 69 against the surface of the timer base. A supporting biasing force, in a counterclockwise direction as seen in FIGURE 7, and adjustment of bimetal element 64 is achieved by a bolt 66 threadably received by the timer base 24 which carries a ceramic insulating collar 67. Collar 67 has a cylindrical portion which projects between the legs of the bimetal and a shoulder 68 which abuts against the legs of the bimetal. Moving the shoulder 68 along the axis of bolt 66 toward the base 24 causes an upward deflection of the cantilevered portion of bimetal 64 to increase the deflection required to engage and pivot the escapement lever 37 and thereby increase the time duration of the cycle. The upper ends of rivets 70, 71 serve as electrical terminals and the lower end of rivet 71 provides an electrical contact.

A spring leaf member 73 carried by the lower end of rivet 70 serves as a shorting switch and normally provides a shorted electrical circuit electrically interconnecting rivets 70, 71 and thereby substantially eliminating the bimetal from a current carrying heat generating condition. When the control lever is depressed so that the projection 75 engages the ceramic insulating cap 76 carried by the switch leaf 73, as shown in the full line portion of FIGURE 4, the leaf is removed from contact with the terminal 71 to place the U-shaped bimetal element 64 electrically in series between the terminals.

Factory adjustment of the bimetal element 64 is provided by turning the adjusting screw 66 to vary the initial deflection of the cantilevered end of the bimetal.

In operation the carriage 15 is depressed either by manual operation or power means (not shown) causing the carriage projecting portion 62 as it approaches its downward limit of travel to engage the control lever portion 61 and pivot the control lever in a clockwise direction as viewed in FIGURE 4 from the dotted line position to the solid line position at which time the control lever tab portion 81 is retained by the latching surface 47 of the escapement lever assembly heat up latch 46. The carriage is restrained against upward travel by engagement between the carriage projection 63 and the lower surface of the control lever.

Simultaneously with the downward pivoting of the control lever 26 to the position where it is retained by heat up latch 46 the downwardly depending projection 75 has depressed switch leaf 73 to interrupt the electrical contact between leaf 73 and the head of rivet 71 to thereby cause current to flow through the U-shape bimetal element. Downward travel of the carriage has also caused the pair of line switches 83 schematically shown in FIGURE 8 to be closed by means not shown. As the bimetal element 64 becomes heated, it warps downwardly to engage the electrically insulating contact member 85 carried by the escapement lever assembly and pivot the escapement lever assembly 37 in a clockwise direction as viewed in FIGURE 5. When the escapement lever has been pivoted sufficiently the control lever projection 81 is released from engagement by the latching surface 47 and is urged upwardly by the force of spring 35 which pivots the control lever in a counterclockwise direction and also by the tension spring 19 which urges the carriage upward. The control lever then moves slightly upward into retained engagement with the latching surface 45 of the cool off latch 44 which does not permit the carriage 15 to be released from retaining engagment by the control lever 26 but does permit sufficient upward travel to disengage the control lever depending portion 75 from engagement with the escapement lever contact member 85, causing the switch leaf 73 to again engage the lower contact portion of rivet 71 and shunt substantially all current directly between the terminals at the upper ends of rivets 70, 71. The bimetal 64 thereupon commences a cooling cycle with the cantilevered end moving gradually upward permitting the escapement lever to correspondingly move in a counterclockwise direction as viewed in FIGURE 5 until the control lever is disengaged from the escapement lever latching surface 45 releasing the control lever from a carriage restraining position, whereupon the tension spring 19 raises the carriage opening the line switches 83 and terminating the cycle.

Manual release of the carriage and termination of the toasting cycle is achieved at any time by simply depressing and raising the timing shaft 50. By so pivoting the escapement lever in both directions, the carriage will be released during any portion of the toasting cycle. Timing shaft 50 will project through the case of the toaster and carry a knob for manual control of the toasting cycle by rotation about the axis of shaft 50 and cycle termination and carriage release by upward and downward pivotal motion.

In FIGURE 7 the escapement lever assembly 37 is shown in an alternate position mounted on a depending downwardly turned portion 87 of the timer base 24 through an aperture 88 (shown in FIGURE 1). In this modification the heat up latch 46 and cool off latch 44 engage an alternate tab portions 89 presented by the control lever 26 to retain the control lever in the same two downwardly depressed positions during operation. Pin 91 and aperture 92 provide an alternate mounting location for the leaf spring 40 which engages the latch member projection 42 to normally rotate the escapement lever assembly in a counterclockwise direction, as seen in FIGURE 7, to a position where the latch member surface 95 abuts the upper surface of the timer base projection 96. The same parts are used for the timer assembly irrespective of which of the two positions is occupied by the escapement lever assembly. Further the escapement lever assembly may be readily interchanged between the mounting locations.

Although but one embodiment has been shown and described, it will be apparent to those skilled in the art that various changes and modifications may be made therein without departing from the spirit of the invention or the scope of the appended claims.

We claim:

1. In an electric toaster having a bread slice supporting carriage vertically movable between an upper loading position and a lower toasting position, a timing mechanism comprising a timer base; a control lever pivotally mounted on said timer base presenting a latching portion for engaging said carriage and retaining said carriage in said lower toasting position; and an escapement lever pivotally mounted on said timer base presenting first and second confronting latching members respectively engageable with said control lever to retain said control lever in first and second carriage retaining positions, means for selectively moving one of said latching members toward and away from other of said latching members; means biasing said escapement lever in one direction; and bimetal means carried by said timer base and engageable with said escapement lever to pivot said escapement lever in a direction opposite of said one direction in response to a change in the temperature of said bimetal.

2. In an electric toaster having a bread slice supporting carriage vertically movable between an upper loading position and a lower toasting position, a timing mechanism comprising a timer base; a control lever pivotally mounted on said timer base presenting a latching portion for engaging and retaining said carriage in said lower toasting position and an escapement engaging portion; an escapement lever pivotally connected to said timer base presenting first and second latch members respectively presenting first and second confronting latching portions for engaging said control lever to respectively retain said control lever at first and second carriage retaining positions; biasing means urging said escapement lever in one pivotal direction, said first latching portion being movable with respect to said second latching portion for selected movement toward and away from said second latching portion, said latch members being interconnected for unitary pivotal movement; and bimetal means carried by said timer base and engageable with said escapement lever to overcome said biasing means and pivot said escapement lever in a direction opposite of said one direction.

3. In an electric toaster having a bread slice supporting carriage movable between a raised loading position and a lowered toasting position, a heat-up cool-down type timing mechanism comprising a timer base; a control lever pivotally mounted on said timer base, said control lever constructed and arranged when moved to one position to engage a part on said carriage to retain said carriage in said toasting position and when pivoted to another position to release said carriage; an escapement lever pivotally mounted on said timer base and including first and second confronting latching portions for sequentially engaging said control lever and retaining said control lever in said one position; said escapement lever being biased in one pivotal direction; bimetal means carried by said timer base and movable upon being heated to engage and pivot said escapement lever in the pivotal direction opposite said one direction; heating means for selectively heating said bimetal means, said heating means being energized when said control lever is retained by said first confronting latching portion and de-energized when said control lever is retained by said second confronting latching portion.

4. The timing mechanism of claim 3 wherein said second latching portion is selectively movable toward and away from said first latching portion.

5. In an electric toaster having a bread slice supporting carriage movable between an upper loading position and a lower toasting position, a timing mechanism comprising a support having a pair of horizontally spaced parallel wall portions with aligned apertures therein, said apertures being in the form of generally circular sectors wherein the chord of the curvate portion is of greater length than the radius thereof; a control lever having a pair of trunnions respectively projecting through said apertures, one of said trunnions having an end portion with a maximum dimension greater than said radius and less than said chord; a tab portion projecting from said control lever which is positioned after assembly of said trunnions within said wall portion apertures to prevent pivoting said one of said end portions to a position parallel to the chord of the adjacent of said apertures; and means carried by said control lever for retaining said carriage in said toasting position at the initiation of a toasting cycle and means for releasing said control lever from a carriage retaining position at the termination of a toasting cycle.

6. In an electric toaster having a bread slice supporting carriage movable between an upper loading position and a lower toasting position, a timer mechanism comprising a support having a pair of spaced apertured projections carried thereby, said apertures being formed as generally circular sectors with the chord length being greater than the radius thereof; a control lever having latch means for retaining said carriage in said toasting position and pivotally mounted to said support by a pair of trunnions disposed in said projection apertures, one of said trunnions having an end portion with a maximum dimension greater than said radius and less than the length of said chord to permit assembly through said aperture; means positioned after assembly of said trunnions within said apertures to prevent pivoting of said trunnion end portion to a position of parallelism with the chord of the cooperating aperture; first and second escapement lever mounting projections carried by said support; an escapement lever pivotally connectable to said support at either of said first or second escapement lever mounting projections and presenting first and second confronting latching portions for respectively retaining said control lever in first and second carriage retaining positions; said confronting latching portions being carried by said escapement lever for unitary pivotal movement, with one of said latching portions being selectively slidably movable toward and away from the other of said latching portions, said first latching portion facing in one escapement lever pivotal direction and said second latching portion facing in the opposite of said one pivotal direction; biasing means urging said escapement lever in said one pivotal direction; means disposed with respect to said escapement lever in one pivotal direction; bimetal means said escapement lever in said opposite of said one pivotal direction upon heating of said bimetal; bimetal heating means; and control means for activating said bimetal heating means when said control lever is in said first carriage retaining position and inactivating said bimetal heating means when said control lever is in said second carriage retaining position.

7. In an electric toaster having a bread slice supporting carriage movable between an upper loading position and a lower toasting position, a timing mechanism comprising a timer base; a control lever pivotally mounted on said timer base presenting a latching portion for engaging said carriage and retaining said carriage in said lower toasting position; an escapement lever pivotally mounted on said timer base presenting first and second confronting latching portions respectively engageable with said control lever to retain said control lever in first and second carriage retaining positions; biasing means urging said escapement lever in one pivotal direction; bimetal means deformable upon being heated to engage said escapement lever, overcome said biasing means, and pivot said escapement lever in the opposite of said one pivotal direction, whereby said control lever is released by said first latch portion and thereupon retained by said second latch portion; heating means for heating said bimetal when said control lever is retained by said first latch portion, said heating means being inactivated when said control lever is retained by said second latch portion, said second latching portion facing in a direction opposite of said one pivotal direction and said first latching portion facing in said one pivotal direction.

8. In an electric toaster having a bread slice supporting carriage movable between a loading position and a toasting position, a timing mechanism comprising a support; a control lever pivotally mounted on said support, said control lever constructed and arranged when moved to one position to engage a part on said carriage to retain said carriage in said toasting position and when pivoted to another position to release said carriage; an escapement lever for pivotal mounting on said support and including first and second confronting latching portions for respectively sequentially engaging and retaining said control lever in said one position and a pair of mouting portions projecting from said support and disposed in non-parallel planes, each said mounting portion adapted to have said escapement lever pivotally mounted thereto and means pivotally connecting said escapement lever to one of said pair of mounting portions.

9. In an electric toaster having a bread slice supporting carriage movable between a loading position and a lowered toasting position, a timing mechanism comprising a support; a control lever pivotally mounted on said support having latch means engageable with said carriage to retain said carriage in first and second toasting positions; first and second nonparallel mounting projections carried by said support; an escapement lever pivotally mounted on said support at one of said mounting projections having confronting latching portions sequentially engageable with said control lever to cause said control lever to retain said carriage respectively in first and second toasting positions, said control lever having a first escapement lever engaging portion arranged to be engageable with said escapement lever latch portions when said escapement lever is pivotally mounted at said first mounting projection and a second escapement lever engaging portion arranged to be engageable with said escapement lever latch portions when said escapement lever is pivotally mounted at said second mounting projection.

10. In an electric toaster having a bread slice supporting carriage movable between a raised loading position and a lowered toasting position, a heat-up cool-down type timing mechanism comprising a timer base; a control lever pivotally mounted on said timer base, said control lever constructed and arranged when moved to one position to engage a part on said carriage to retain said carriage in said toasting position and when pivoted to another position to release said carriage; an escapement lever pivotally mounted on said timer base and including first and second confronting latching portions for sequentially engaging said control lever and retaining said control lever in said one position; said escapement lever being biased in one pivotal direction; an aperture in said timer base; a cantilevered bimetal element; an adjustment bolt engaging a midportion of said bimetal element and applying a biasing force to said bimetal element; an insulating block secured to said bimetal member at one end thereof and extending through said aperture; retaining shoulders presented by said insulating block which engage said timer base and resist the biasing force applied by said adjustment bolt; the free end of said cantilevered bimetal element being movable upon being heated to engage and pivot said escapement lever in the pivotal direction opposite said one pivotal direction; and heating means disposed in heat delivering relation to said bimetal element, said heating means being energized when said control lever is retained by said first latching portion and de-energized when said control lever is retained by said second latching portion.

References Cited by the Examiner

UNITED STATES PATENTS

| | | | |
|---|---|---|---|
| 2,234,759 | 3/1941 | Graham | 99—329 |
| 2,266,024 | 12/1941 | Gomersall | 99—329 |
| 2,274,810 | 3/1942 | Sardeson | 99—329 |
| 2,367,044 | 1/1945 | Newell | 99—329 |
| 2,537,408 | 1/1951 | Hansen | 99—329 |
| 2,549,094 | 4/1951 | Huck | 99—329 X |
| 2,558,199 | 6/1951 | Scharf | 99—329 |
| 2,720,156 | 10/1955 | Theisen | 99—329 |

BILLY J. WILHITE, *Primary Examiner.*